(12) United States Patent
Ryan, Jr. et al.

(10) Patent No.: US 10,915,789 B2
(45) Date of Patent: *Feb. 9, 2021

(54) SYSTEM AND METHOD OF DETECTING OFFENSIVE CONTENT SENT OR RECEIVED ON A PORTABLE ELECTRONIC DEVICE

(71) Applicant: PocketGuardian, LLC, Silver Spring, MD (US)

(72) Inventors: James Ronald Ryan, Jr., Charlotte, NC (US); Jason Otis France, Silver Spring, MD (US)

(73) Assignee: PocketGuardian, LLC, Silver Spring, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,355

(22) Filed: Dec. 19, 2018

(65) Prior Publication Data

US 2019/0266444 A1 Aug. 29, 2019

Related U.S. Application Data

(63) Continuation of application No. 15/255,918, filed on Sep. 2, 2016, now Pat. No. 10,198,667.

(60) Provisional application No. 62/213,272, filed on Sep. 2, 2015.

(51) Int. Cl.
G06K 9/62 (2006.01)
H04L 29/06 (2006.01)
H04L 29/08 (2006.01)
H04L 12/58 (2006.01)
H04W 12/02 (2009.01)

(52) U.S. Cl.
CPC .......... *G06K 9/6256* (2013.01); *G06K 9/627* (2013.01); *G06K 9/6257* (2013.01); *G06K 9/6277* (2013.01); *H04L 51/04* (2013.01); *H04L 51/12* (2013.01); *H04L 67/10* (2013.01); *H04L 67/26* (2013.01); *H04L 67/42* (2013.01); *H04W 12/02* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 8,826,426 B1* | 9/2014 | Dubey | H04L 63/14 726/22 |
| 2009/0060351 A1* | 3/2009 | Li | G06K 9/4642 382/224 |
| 2015/0095014 A1* | 4/2015 | Marimuthu | G06F 17/2735 704/9 |
| 2016/0350675 A1* | 12/2016 | Laks | G06Q 50/01 |

* cited by examiner

*Primary Examiner* — David Perlman (57) ABSTRACT

The present invention is directed at a system, method and device for detecting offensive content on a portable electronic device, by monitoring communications sent, received or stored on the portable electronic device, and wherein monitoring comprises collecting content data, classifying content data by calculating an alert score for content data wherein an alert score corresponds to offensive content detected, and sending an alert notification to a second portable electronic device to alert the detection of offensive content on the first portable electronic device.

7 Claims, 12 Drawing Sheets

IMAGE 401   403   IMAGE FEATURE VECTOR 405

B:

IMAGE FEATURE VECTOR 405   ×   COMPARISON MATRIX 407   = score

MATRIX MULTIPLICATION

C:

Non-Alert Score

COMPARISON MATRIX

MATRIX MULTIPLICATION

SYSTEM AND METHOD OF DETECTING OFFENSIVE CONTENT SENT OR RECEIVED ON A PORTABLE ELECTRONIC DEVICE

CROSS REFERENCE TO RELATED APPLICATIONS

This application is a continuation of U.S. patent application Ser. No. 15/255,918, filed Sep. 2, 2016, which in turn claims the benefit of the priority date of earlier filed U.S. Provisional Patent Application No. 62/213,272, filed on Sep. 2, 2015 the contents which are hereby incorporated by reference in their entirety.

STATEMENT REGARDING FEDERALLY SPONSORED RESEARCH

This invention was developed without the use of any federal funds.

BACKGROUND OF THE INVENTION

The field of the invention is electronic communications. Particular embodiments of the invention are applicable to monitoring electronic communications between portable electronic communication devices.

Cyberbullying is bullying that takes place using electronic technology. Sexting is sending sexually explicit photographs or messages via electronic technology. Electronic technology includes devices and equipment such as cell phones, computers, and tablets as well as communication tools including social media sites, text messages, chat, and websites. Examples of cyberbullying include sending abusive text messages or emails, circulating stories or reports of uncertain or doubtful truth by email or posting on social networking sites, circulating embarrassing pictures, videos, websites, or fake profiles. While electronic messaging such as SMS, MMS and text messaging is a very useful means of communication, this form of communication has also lead to the unfortunate rise in cyberbullying, the transmission and receiving of sexual images ("sexting") and other inappropriate or other targeted content, which collectively can be deemed as "offensive" content.

With the ease of access to electronic technology, social media sites and apps, instances of cyberbullying and sexting among teens in the United States is on the rise. In a survey by the National Campaign to Prevent Teen and Unplanned Pregnancy of teens (13-19), it reported that 31% had received a nude or semi-nude picture from another person. Recent studies have reported numbers of teen cyberbullying as high as 72%. Cyberbullying & Sexting, while occurring online over electronic technology, have many offline consequences for victims of cyberbullying and sexting. Depression, drug abuse, violence and suicide are among the list of direct consequences of cyberbullying & sexting, and have received much press recently in the United States.

SUMMARY OF THE INVENTION

Described herein is a system, method and device for monitoring electronic communications by detecting content on a portable electronic device and classifying content by correlating content to one of an alert score or a non-alert score, where an alert score refers to content having a high probability of containing offensive content. Offensive content as used herein refers to content related to cyberbullying, sexting and nude images, whether in written form (text), video, and/or imagery (digital photos) that is sent and/or received on a portable electronic device. Examples include language or images that are harmful, hurtful, embarrassing, or threatening. While the interpretation of content can be subjective, cyberbullying and sexting content have consistent and recognizable attributes, permitting objective metrics for content analysis using the present invention.

In one embodiment, the system disclosed herein comprises a first portable electronic device, configured with a monitoring application, wherein the application monitors communications received on the device, stored on the device, and sent from the device. In one embodiment, the monitoring application is configured to detect the presence of offensive content on the portable electronic device by comparing content on the device against one or more training data sets and determining the likelihood that the content contains offensive content based on an alert score calculated. The detection of offensive content triggers an alert comprising an electronic alert delivered as a text alert or email alert, to a second portable electronic device. The reporting device is configured for receiving alerts as well as reports related to alerts for one or more monitored devices. In one embodiment, a text alert may be sent to the second portable electronic device (reporting device), such as a mobile phone of a child's parent, to notify the parent of the detection of offensive content on child's device.

In one embodiment, the system may be configured with a privacy mode. For example, the system is configured to send an alert to the reporting device in response to an alert score regarding content received on the first portable electronic device, however, in a privacy mode the content itself is not viewable on the reporting device, nor is content stored in data storage of the system. This is done to protect the child's privacy, save them from embarrassment, and maintain parent-child trust, while alerting the parent so that the parent is able to help their child. This approach differs from existing "spyware" systems, devices, and applications which allow parents to see the complete text or image, whether flagged as offensive or not.

DETAILED DESCRIPTION OF THE INVENTION

The following terms are used in this disclosure to describe different aspects of the invention and the environment in which the invention operates. These terms are used for explanation purposes only and are not intended to limit the scope for any aspect of the invention.

Content and sub-content as used herein refers to one or more, or a portion thereof, of the following: SMS and MMS messages, text messages, a digital image, photo, video, video stream, animation, emoji, social network feed (such as Facebook, Twitter) content.

Offensive content as used herein is content that has a negative impact on another person, may cause another to feel deeply hurt, upset, feel threatened, or angry by the language or imagery of the content.

Portable electronic device as used herein refers to various devices such as a smartphone (iPhone, Android), a tablet, a portable computer, or other similar portable Information Systems (IS) or devices with the capability of wireless or LAN connectivity and configured with wireless communication capabilities including but not limited to Wi-Fi, Bluetooth, and cellular communications.

The present invention is directed at a system, method and device for detecting offensive content on a portable electronic device, by monitoring communications sent, received or stored on the portable electronic device, and wherein monitoring comprises collecting content data, classifying content data by calculating an alert score for content data wherein an alert score corresponds to offensive content detected, and sending an alert notification to a second portable electronic device to alert the detection of offensive content on the first portable electronic device.

As used herein, communications is intended to include all forms of electronic communications sent via portable electronic devices, including but not limited to SMS and MMS. Short Message Service {SMS) refers to a text messaging service component of phone, web, or mobile communication systems, using standardized communications protocols that allow the exchange of text messages between portable electronic communication devices.

Current communication protocols used to deliver such services include GSM, CDMA, GPRS; 3G networks such as W-CDMA, EDGE or CDMA2000 and 4G networks, though additional protocols and networks may be implemented. Text messaging is a widely used communications service provided by wireless carriers and mobile app companies (e.g. WhatsApp). Multimedia Messaging Service (MMS) is a standard way to send messages that include multimedia content (images, video, etc.) to and from mobile phones and mobile communication devices. Text messages, images (pictures), video and audio can be transmitted using Wi-Fi, Bluetooth or other wireless technology over the Internet and as well as cellular communications (LTE, 4G) and are all envisioned within the scope of this disclosure.

In one embodiment, a system comprises a first portable electronic device configured with a monitoring application and in communication with one or more database servers whereon are stored a training module, a classification module and an alert module, wherein the alert module is configured for communication with a second portable electronic device. In another embodiment, the classification module is configured for communication with the second portable electronic device.

In one embodiment of the present invention, a method for detecting offensive content received on a first portable electronic device from one or more external data sources, comprises: capturing a candidate set of training content from publicly available data, using keywords and data source as the initial selection criteria; analyzing and filtering the content; assembling a final training data set; transforming training content data into a normalized representation removed of extraneous characters; extracting one or more of a feature vector from each transformed sample using a combination of stop words, unigrams and bigrams; calculating the probability that a given feature vector is associated to a known sub-category from the training data; storing the feature vector to probability into a mapping that separates each of the sub-categories from one another; and upon receiving a new content sample, transforming the new content sample, creating one or more new feature vectors; retrieving sub-category probability per feature vector, wherein the content corresponds to a particular content; calculating one of an alert score or non-alert score; and sending an alert to a second portable electronic device in response to a calculation of an alert score.

In another embodiment, a method for detecting offensive content received on a first portable electronic device and notifying a second portable electronic device of the offensive content detected, comprises: capturing a candidate set of training images from public data, using metadata key words as the initial selection criteria; analyzing the visual content of the candidate set to filter for final training data; extracting pixel-level image features using counts based on one or more of color, shape, and texture, from the candidate set to generate a high-dimensional matrix representation; applying probabilistic estimation based on feature counts, to learn a weighted feature vector that separates the positive and negative candidate images; upon receiving a previously unseen image, extracting image features, and then performing matrix multiplication to calculate the product of the weighted model feature vector and the input image feature vector to calculate a score, where the score is one of an alert score or a non-alert score.

In another embodiment, a method for detecting offensive content received on a first portable electronic device and notifying a second portable electronic device of the offensive content detected, comprises: capturing a candidate set of training videos from public data, using metadata key words as the initial selection criteria; reviewing the visual content of the candidate set to filter for final training data; extracting pixel-level video frame features using counts based on one or more of color, shape, and texture, from the candidate set to generate a high-dimensional matrix representation; applying probabilistic estimation based on feature counts, to learn a weighted feature vector that separates the positive and negative candidate video frames; upon receiving a previously unseen video, extracting video frame features, and then performing matrix multiplication to calculate the product of the weighted model feature vector and the input video frame feature vector to calculate a score, where in the score is one of an alert score or a non-alert score.

In one embodiment, an exemplary system for a detection of offensive content on a first portable electronic device and a corresponding alert notification to a second portable electronic device has three core components:

1. A training module configured for the ingestion of content comprising one or more of text, video and imagery from external data sources including cloud storage back-ups, internet websites, such as Google, and social media networks, (collectively, "training data") in order to compile a training data set. The training module comprises one or more algorithms for culling data from various sources, ingesting data into the training module for processing in order to generate training data sets. In one embodiment, the training mode resides on a server in communication with a plurality of external data sources to retrieve data based on active searches based on seed words, phrases or images, and pulls data from the external data sources at timed intervals in order to generate a collection of training data. In another embodiment, the training module is in communication with a classification server to which it passes training data sets once compiled. In one embodiment, training data sets are stored in memory on the training module server, in another embodiment, training data sets are stored on the classification server.

2. A classification module configured for classification of content and calculating one of an alert score of non-alert score. In one embodiment, the classification module performs automated detection of offensive content received on a first portable electronic device configured as a monitored device, wherein content is classified as offensive content if a score exceeds a threshold score (corresponding to an alert score) when compared against training data sets. Classification module resides on a classification server in communication with the training module and notification module, and is configured for communication with one or both of a monitored device and a reporting device. In one embodiment, a classification module comprises one or more learning algorithms or classification algorithms to detect offensive content, including but not limited to Naïve Bayes, Expectation Maximization and the like.

3. A notification module configured for sending a notification alert from the classification server to a second portable electronic device configured as a reporting device, when a threshold score is exceeded (corresponding to an alert score) alerting the user of the second portable electronic device of the detection of offensive content on the first portable electronic device. The notification module is further configured for compiling a notification record comprising an alert history stored on a database in communication with the notification module. In one embodiment the notification module resides on the classification server, and in communication with the classification module, and is configured for communication with a reporting device.

Exemplary Training Module

Figure 1:
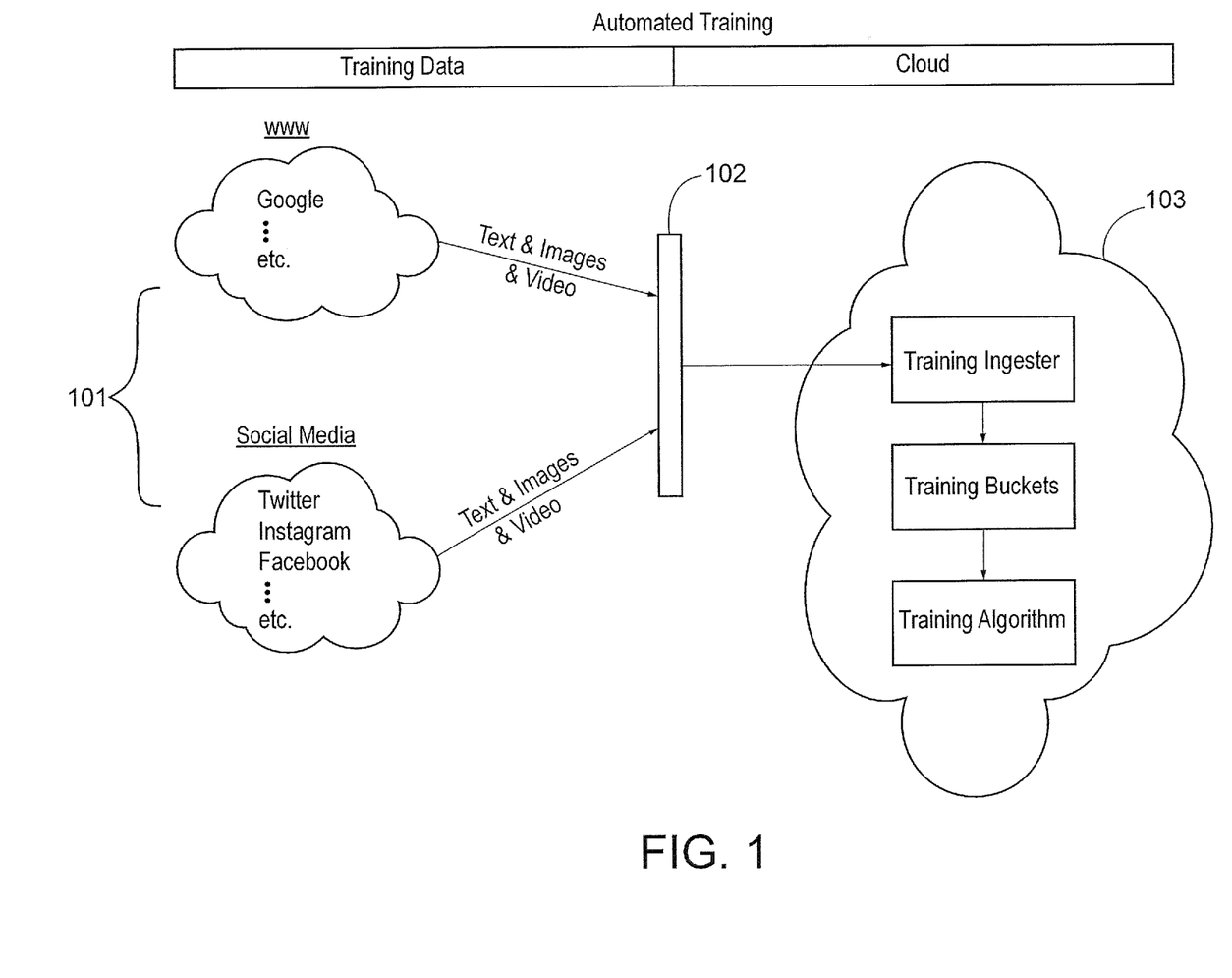
FIG. 1 is an overview of an exemplary notification system according to one embodiment of the invention, which detects offensive content sent or received on a first portable electronic device and sends a notification alert to a second portable electronic device in response to detection.

An exemplary training mode of a system and method for detecting offensive content on a portable electronic device is shown in FIG. 1 including (collectively) training data 101 and ingestion of training data into cloud server 103 configured with training modules 105. In one embodiment, at automated intervals, training data (shown collectively as data 101) is ingested into an online cloud-based training server 103 by cloud compute machines and stored onto online cloud file storage (termed "training buckets") on server 103. After manually reviewing the training data, training algorithms run via cloud compute machines ingest training data 101 collected in order to create training data models.

In one embodiment, collected training data is stored into "buckets" or categorized, such as folders sorted by initial classification assumption. For example, a query of Twitter may be made for tweets containing the word "sex", and an assumption is made that the Tweets are sexting, and would be stored into a sexting bucket. Each tweet is reviewed—manually—to ensure it truly is sexting; if a tweet is in the wrong bucket it may be re-assigned to the correct bucket or discarded.

In one embodiment, training data and or training images are collected from a web search and from social media sites using their AP's. In another embodiment, training data is collected via web search using key words, phrases, and images as input. In another embodiment, training data is collected from social media sites by using either the sites API to search on key words/phrases, or by query of content from a known user account/profile. Exemplary resources include but are not limited to: Google, Twitter, and Instagram. In one embodiment, the collection process occurs at set intervals of the day to adhere to API guidelines of social media sites.

In one embodiment, the training data is stored in an online cloud storage service or other suitable cloud storage service. In another embodiment, the training and detection algorithms reside in elastic computer cloud environment or other suitable virtual computing environments in the cloud.

In one embodiment, offensive content is catalogued and classified by advanced learning algorithms to detect offensive content, which is a significant technological advancement over present known methods which employ simple keyword look-ups as the basis of detection. The system and method of the present invention not only detects offensive content; it does so by a system configured with one or more learning algorithms that adapt to cultural trends, such as slang terms.

In one embodiment, training data consists of content from social media (tweets, comments, etc.) and content from the Internet (message boards, blogs, media outlets, etc.). Training comprises transforming content into text, absent special characters or features. For example, consider data collected from social media sites, such as the following hypothetical tweet from Twitter: "#FearTheWalkingDead premiere should've been two hours ended right when it was getting good darn you #Ame". Training would transform to the tweet to text-only, specifically: "fearthewalkingdead premiere shouldve been two hours ended right when it was getting good darn you amc"—because the system is configured to extract natural language.

Exemplary Classification and Notification Module

Figure 2:
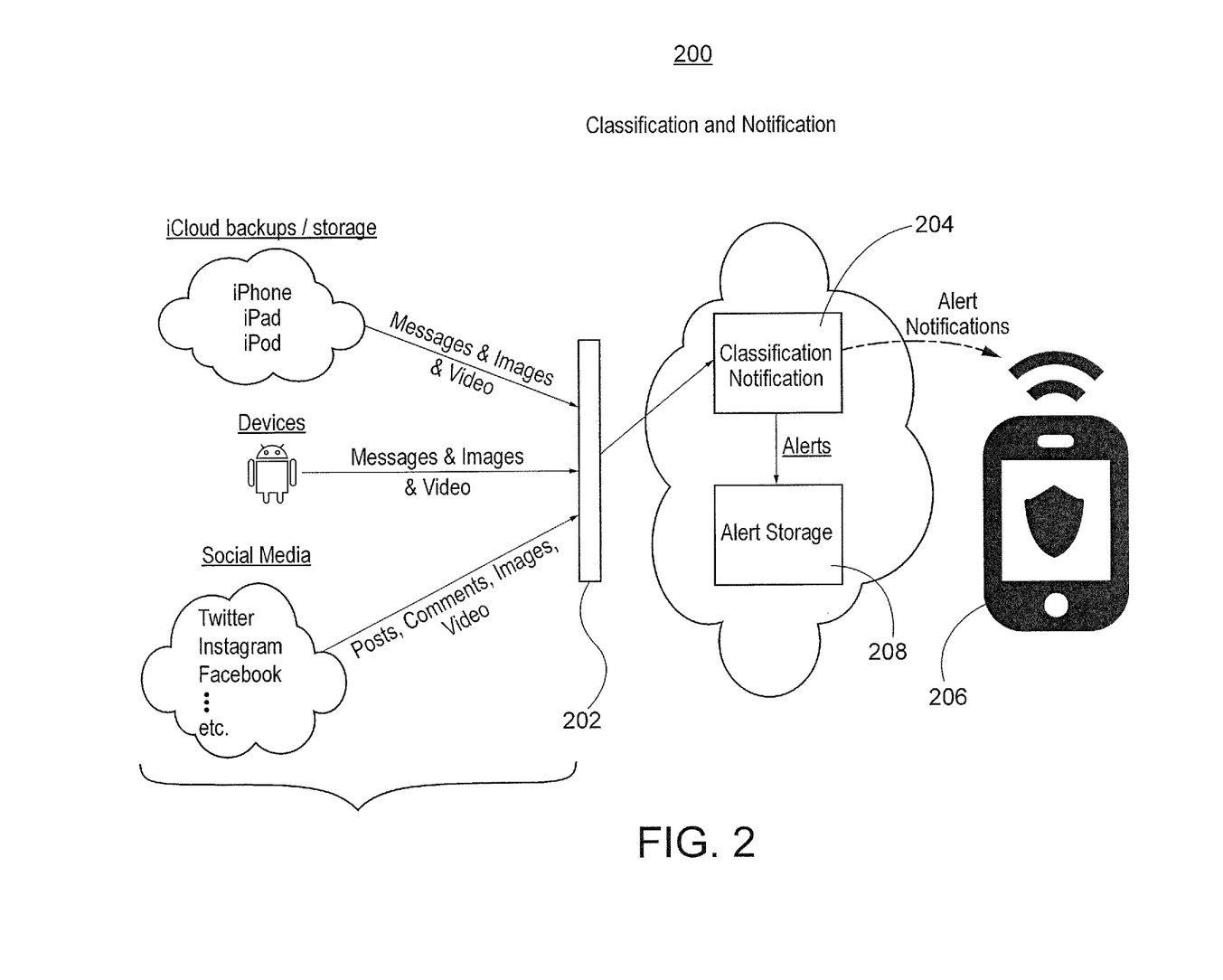
FIG. 2 is an overview of an exemplary system according to one embodiment of the present invention.

Shown in FIG. 2 is an exemplary notification mode of the system according to one embodiment of the invention, which monitors communications to detect offensive content sent or received on a first portable electronic device, and sends a notification alert to a second portable electronic device in response to detection. In one embodiment, content (one or more of text, images, and video) is extracted from a portable electronic device in real time, from portable electronic device cloud storage backups, and from social media sites and sent to the cloud server for analysis via a classification algorithm on the server. The classification algorithm will extract feature vectors from the content, which are then used in conjunction with feature vectors or training models created from the training data set to determine the likelihood the content is offensive. Alerts are created when the classification algorithms detect offensive content. Each alert is stored on an alert storage database and an alert notification is generated. For example, an alert is sent to a parent device, and is received by the parent device as one or both of a text or email; alternatively, the alert is logged in a parent account (such as an electronic record stored on a database) that is accessed by the parent over a web portal.

In another embodiment, when algorithms detect offensive content a notification is automatically created and sent to the parent device and stored in a database, such as a NoSQL database that resides in the cloud. In another embodiment, the system is configured to associate a time stamp with content, so that a record is retained containing the send/receive date time of the content, the child's device name (ex: James's iPhone), the alert type (bully, sext, etc.), whether the content was sent or received to the device it was detected on and the mobile app/site used to transmit the content. In yet another embodiment, the system is configured with a database to store additional information, such as parents email address (account username) and child's unique device identifier (incremental number).

In one embodiment, the offensive content resides in the classification server's memory and is eventually overwritten. In another embodiment, the alert event is stored in a database for later retrieval and may be stored in association with a unique device identifier.

FIG. 2 shows a monitoring application 202 running on a first portable electronic device, that receives content data from one or more content sources (shown in the left side of the figure), including but not limited to: content data from cloud back-ups associated with the device; content data received or stored on the device, such as text messages, images and video; and social media content data, such as posts, comments, images and video posted or sent over a social media platform via the device, the monitoring application in communication with a classification server 204 whereon is stored a classification module and notification module configured to classify incoming content data received by the monitoring application and transmitted over a wireless network to the classification server for processing via the classification module. If content data is detected that exceeds a threshold for normalized content, the content data triggers an alert notification, the alert notification via a notification module. The alert is sent from the classification server 204 to a second portable electronic device 206 configured as a reporting device. An alert record 208 is also stored in a database, which may reside on the classification server 204 or separately, but in communication with the classification server.

Exemplary Alert Notification

When an alert is triggered in response to an alert score, the following information is stored in an alert history database:
Unique portable electronic device identifier of monitored device
Date/time content data of an alert score was sent/received
Category type of content data (bullying, sexting, etc.)
Source of content data (SMS, Facebook, etc.)
Nickname given to monitored device (James's iPhone 5)
Portable electronic device type (iPhone, Samsung Galaxy, etc.)
Identifier for whether content was sent or received The alert information is associated to the device in which the offending content was detected. For example, parents using a reporting device would have access to alert information for the monitored devices they "monitor"—via electronic notification including e-mail notification, text message notification. In another embodiment, the system is configured with a web interface for access to the alert database by an authorized user (such as a parent) or the owner of the reporting device.

Similarly an alert notification is sent to the second portable electronic device (reporting device) containing the following event information:
Date/time content data was sent/received
Content data category type (bullying, sexting, etc.)
Source of content data (SMS, Facebook, etc.)
Nickname given to monitored device (James's iPhone 5)
Portable electronic device type (iPhone, Samsung Galaxy, etc.)
Identifier for whether content was sent or received In another embodiment, when algorithms detect an alert score, a notification is automatically created, and sent to an external source via electronic notification including email alert, text message alert, or alert through a web-based alert database.

In one embodiment, the offensive content resides in the classification server's memory and is eventually overwritten. In another embodiment, an alert notification resides in the classification server's memory, is sent to an external database, and may be eventually overwritten.

In one embodiment, the system is configured to associate a time stamp with content, so that a record is retained containing the send/receive date time of the content, the device name (ex: James's iPhone), the alert type (bully, sext, etc.), whether the content was sent or received to the device on which it was detected, and the mobile application or site used to transmit the content.

Exemplary Detection of Offensive Content Comprising Text

Figure 3:
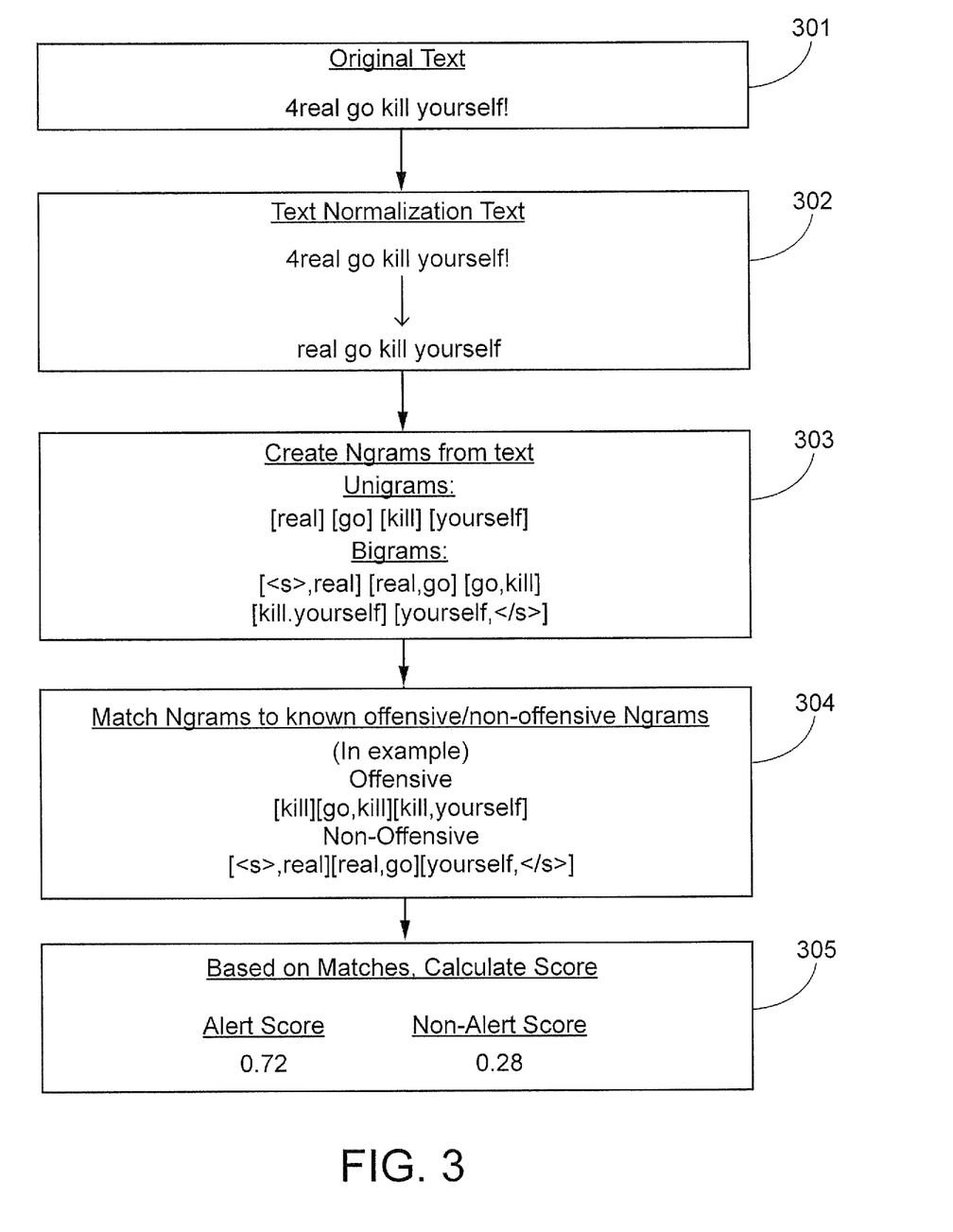
FIG. 3 is an overview of an exemplary system according to one embodiment of the present invention.

Shown in FIG. 3 is an overview of a process 300 for monitoring communications and classifying content comprising text message content. Original text is ingested at step 301 and then normalized at step 302 by generating real language from any slang or symbols. Ngrams are then created from the normalized text, including unigrams and bigrams, at step 303. Ngrams are then matched against training data sets previously categorized to generate an alert score, at step 304. Based on the comparison, a score is calculated corresponding to an alert score or a non-alert score, at step 305.

In one embodiment, a computer-implemented method for detecting offensive content as text received on a first portable electronic device (monitored device) comprises: capturing a candidate set of training text from public data, using keywords and data source as the initial selection criteria; reviewing the content and filtering, thereby assembling a final training data set; transforming training text into a normalized representation removed of extraneous characters; extracting one or more of a feature vector from each transformed sample using a combination of stop words, unigrams and bigrams; calculating the probability that a given feature vector is associated to a known sub category from the training data; storing the feature vector to probability into a mapping that separates each of the sub categories from one another; and upon receiving a new text sample, transforming the new text sample, creating one or more new feature vectors; and retrieving sub-category probability per feature vector, wherein the text corresponds to a particular content.

Exemplary Detection of Offensive Content as Images

Figure 4:
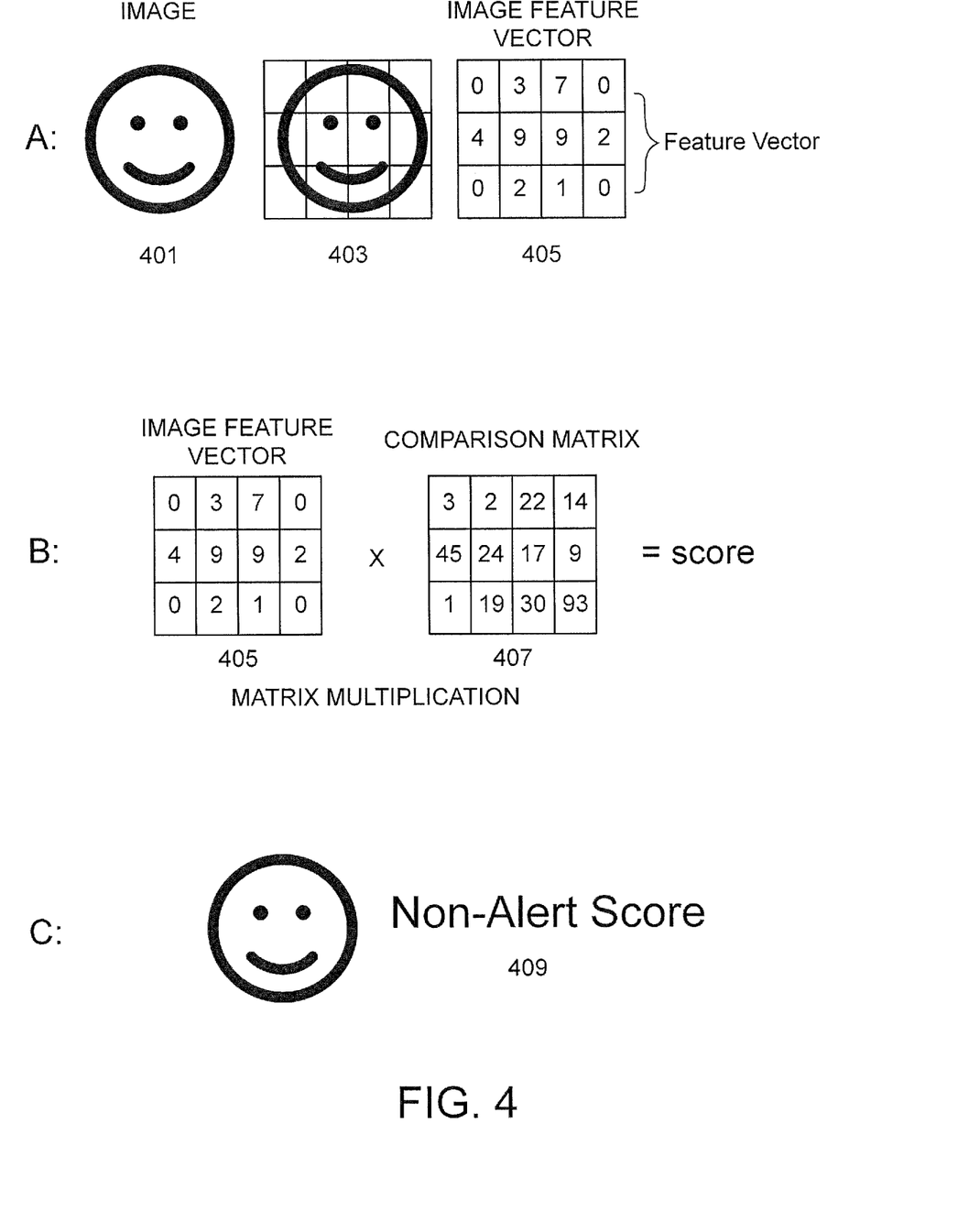
FIG. 4 shows an overview of a system training module according to one embodiment of the present invention.

FIG. 4 shows an overview of a process for monitoring communications and classifying content comprising digital image content. At panel A, an image 401 is mapped against a grid 403 in order to calculate an image feature vector 405. At panel B, matrix multiplication is performed of the image feature vector 405 against the comparison matrix 407, in order to generate a score 409 corresponding to an alert score or a non-alert score (shown in the figure is a non-alert score, which indicates a score corresponding to content that would be categorized as non-offensive).

In one embodiment, a computer-implemented method of monitoring communications and detecting an offensive image on a first portable electronic device (monitored device) comprises: capturing a candidate set of training images from public data, using metadata key words as the initial selection criteria; reviewing the visual content of the candidate set to filter for final training data; extracting pixel-level image features using counts based on one or more of color, shape, and texture, from the candidate set to generate a high-dimensional matrix representation; applying probabilistic estimation based on feature counts, to learn a weighted feature vector that separates the positive and negative candidate images; upon receiving a previously unseen image, follow step 3 to extract image features, and then perform matrix multiplication to calculate the product of the weighted model feature vector and the input image feature vector.

Exemplary Detection of Offensive Content as Video

Figure 5:
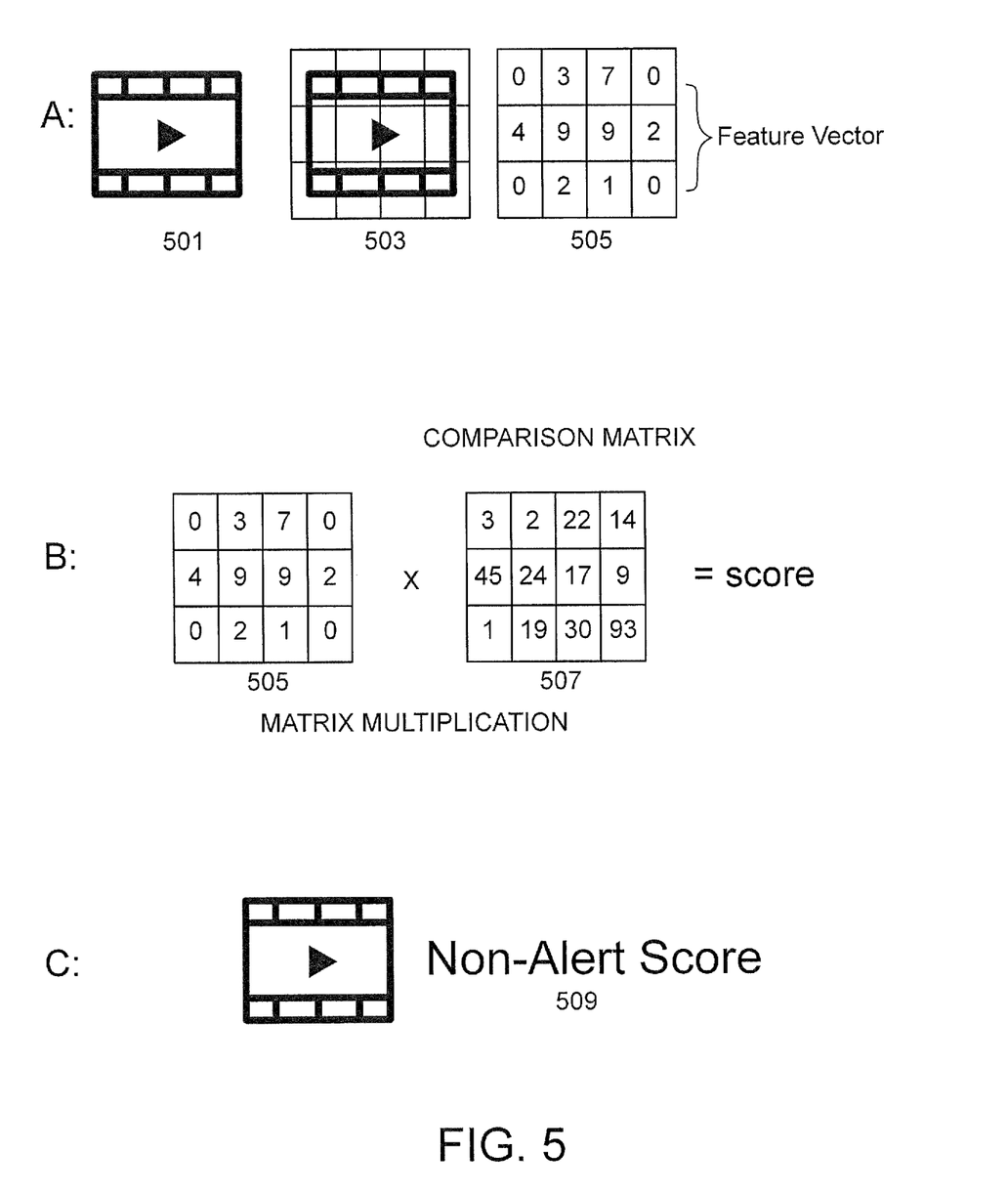
FIG. 5 shows a diagram of an exemplary training process for establishing a data set comprising baseline content values for text message content.

FIG. 5 shows an overview of a process for monitoring communications and classifying content comprising digital image content. At panel A, an image 501 representing a frame of a video stream or clip is mapped against a grid 503 in order to calculate an image feature vector 505. At panel B, matrix multiplication is performed of the image feature vector 505 against the comparison matrix 507, in order to generate a score 509 corresponding to an alert score or a non-alert score (shown in the figure is a non-alert score, which indicates a score corresponding to content that would be categorized as non-offensive).

In one embodiment, a computer-implemented method of detecting an offensive video on a first portable electronic device (monitored device) comprises: capturing a candidate set of training videos from public data, using metadata key words as the initial selection criteria; reviewing the visual content of the candidate set to filter for final training data; extracting pixel-level video frame features using counts based on one or more of color, shape, and texture, from the candidate set to generate a high-dimensional matrix representation; applying probabilistic estimation based on feature counts, to learn a weighted feature vector that separates the positive and negative candidate video frames; upon receiving a previously unseen video, follow step 3 to extract video frame features, and then perform matrix multiplication to calculate the product of the weighted model feature vector and the input video frame feature vector.

In another embodiment, a portable device comprises: a communication unit configured to capture content received on the portable electronic device; a control unit configured to verify detection of offensive content on the portable electronic device, wherein the control unit controls a communication unit configured to communicate with a classification database and receive a score calculated for captured content, wherein an alert score calculated corresponds with offensive content, and wherein upon verification of the offensive content, the portable device is configured to submit identifying information of the portable electronic device, including device ID, date, time and (optionally) GPS location of the device, to a notification system, the notification system configured to send an alert message to a second portable electronic device as an alert regarding the detection of offensive content on the portable electronic device.

In another embodiment, a non-transitory computer-readable medium having recorded thereon a program that causes a portable electronic device to execute a method for monitoring content received on the portable electronic device, the method comprising the steps of: receiving a communication comprising content on a first portable electronic device; transmitting the content to a classification server; comparing, on the classification server, the content received on the portable electronic device against a training data set, the training data set containing a collection of content classified as one of an alert score content and non-alert score content; calculating a score of the content received on the portable electronic device; and generating an alert notification in response to an alert score calculation, wherein the alert notification is an electronic message sent to a second portable electronic device with a notification of the detection of content corresponding to an alert score.

In another embodiment, a method for detecting offensive content received on a first portable electronic device and from external data sources, comprises: identifying content data of a communication sent or received on a first portable electronic device; sending the content data identified from the first portable electronic device to a classification server; analyzing the content data against a training data set; calculating a score of the content data in order to determine an alert score or non-alert score of the content data; sending, in response to an alert score calculated, an alert notification via a notification module in communication with the classification server to a second portable electronic device, wherein the notification comprises a text message or email message, and wherein the alert score corresponds to the identification of offensive content associated with the content data of the first portable electronic device. In another embodiment, the method further comprises capturing a candidate set of training content from a plurality of data sources; filtering the content; assembling a training data set and extracting one or more of feature vectors from each training data set using a combination of one or more stop words, unigrams and bigrams, or feature count from a pixel-level from each data set using counts based on one or more of color, shape, and texture from the candidate set to generate a matrix representation; calculating either the probability that a given feature vector is associated to a known sub-category from the training data or a probability estimation based on feature count, to learn a weighted feature vector that separates the positive and negative candidate images; storing the feature vector and/or probability into a mapping that separates each of the sub-categories from one another, wherein the mapping comprises values identifying an alert score and a non-alert score.

Figure 6:
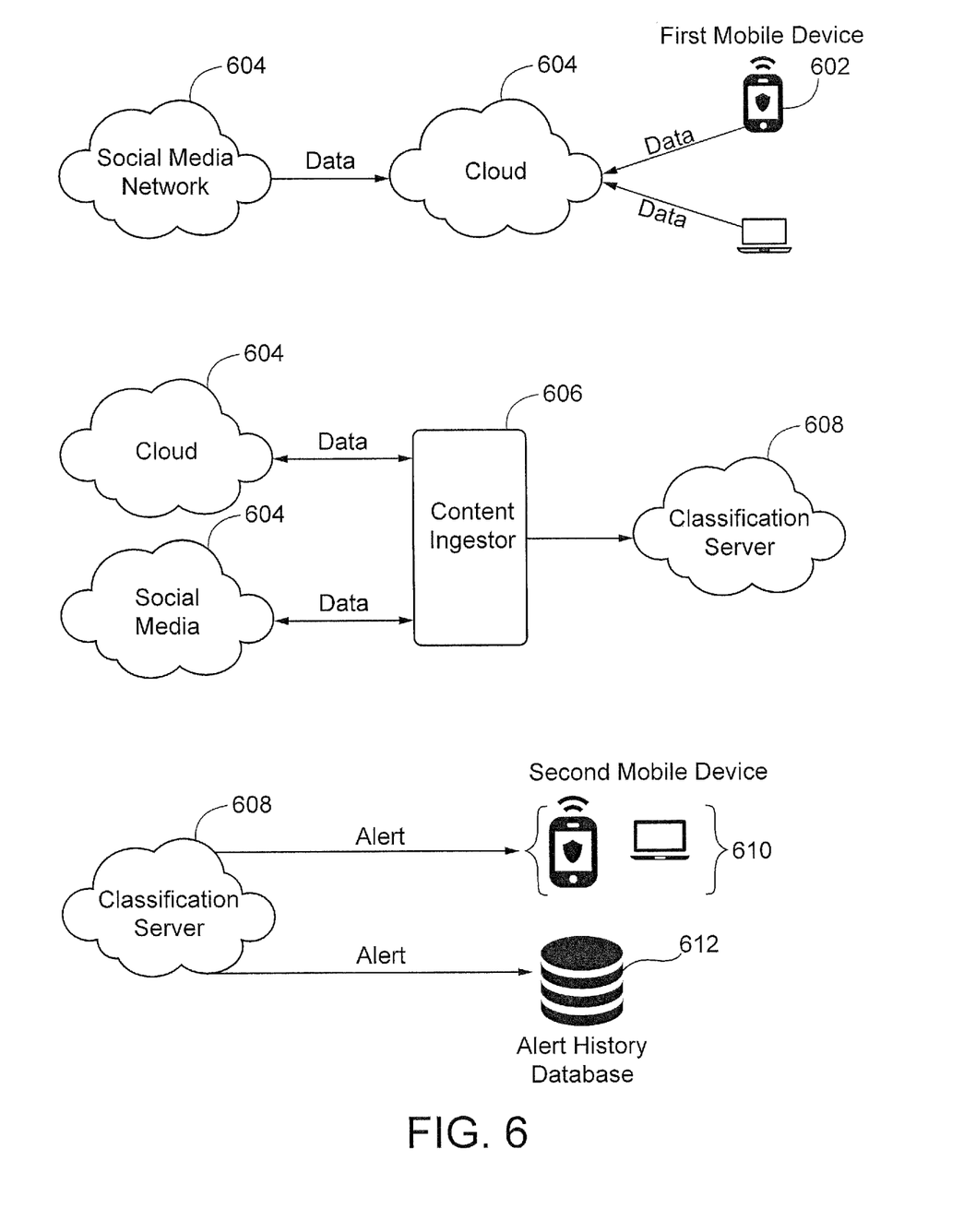
FIG. 6 shows a diagram of an exemplary training process for establishing a data set comprising baseline content values for image content.

Turning now to the remaining Figures, which show additional embodiments and features of the invention. FIG. 6 shows an exemplary system 600 according to one embodiment of the present invention. System 600 components include a first portable electronic device 602 configured with a monitoring application, the device configured for sending and storing data to one or more cloud servers 604, and receiving content data from one or more social networks 606. Content data of cloud server 604 and social media content data 606 associated with the first portable electronic device 602 are collected and ingested by a server configured with a content ingester module 606 that collects content data and transmits the content data to classification server 608, where the content data is classified based on a score assigned to the content data, and if the score exceeds a threshold value an alert is sent from the classification server to a second portable electronic device 610 configured with a monitoring and notification application. Separately, the classification server sends an alert record to an alert history database 612 where it is stored, for later retrieval.

Figure 7:
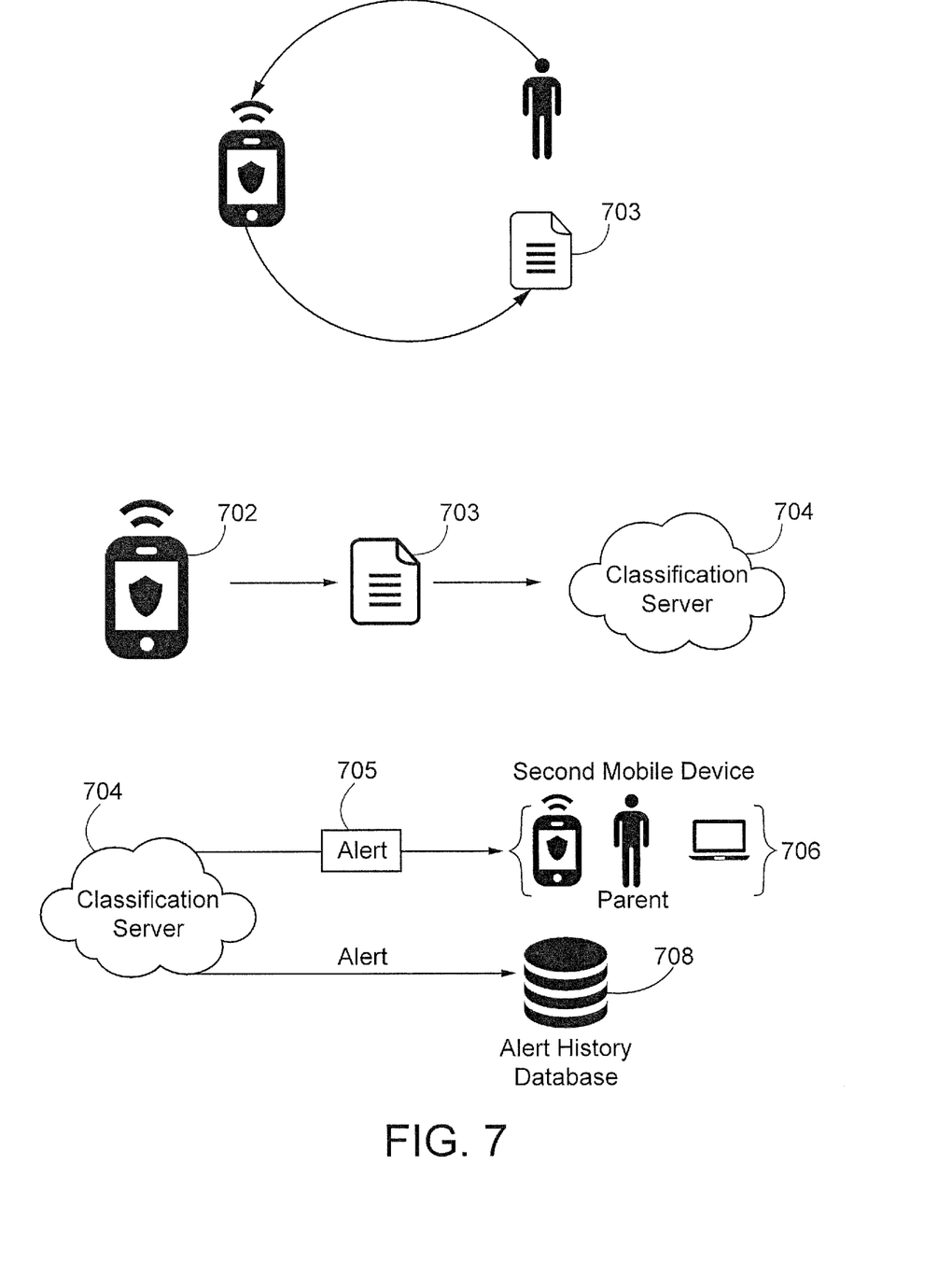
FIG. 7 shows a diagram of an exemplary training process for establishing a data set comprising baseline content values for video content.

FIG. 7 shows a first portable electronic device 702 configured with a monitoring application, also referred to as the monitored device 702. In this example, a user, for example a child, has sent or received content data 703 comprising text messages on the monitored device 702. The monitoring application is configured to detect content data and transfer the content data 703 from device 702 to a classification server 704 for comparison of the content data 703 against a training data set (not shown) in order to calculate a score. If the score calculated exceeds a threshold value, then classification server 704 initiates an alert via a notification mode and sends an alert 705 from the classification server to a second portable electronic device 706 configured as a reporting device, and in this example used by a parent who will be notified by an alert on the reporting device that if the classification server detects content data exceeding a threshold value. An alert record is also sent from the classification server 704 to an alert history database 708 to be stored for later retrieval.

Figure 8:
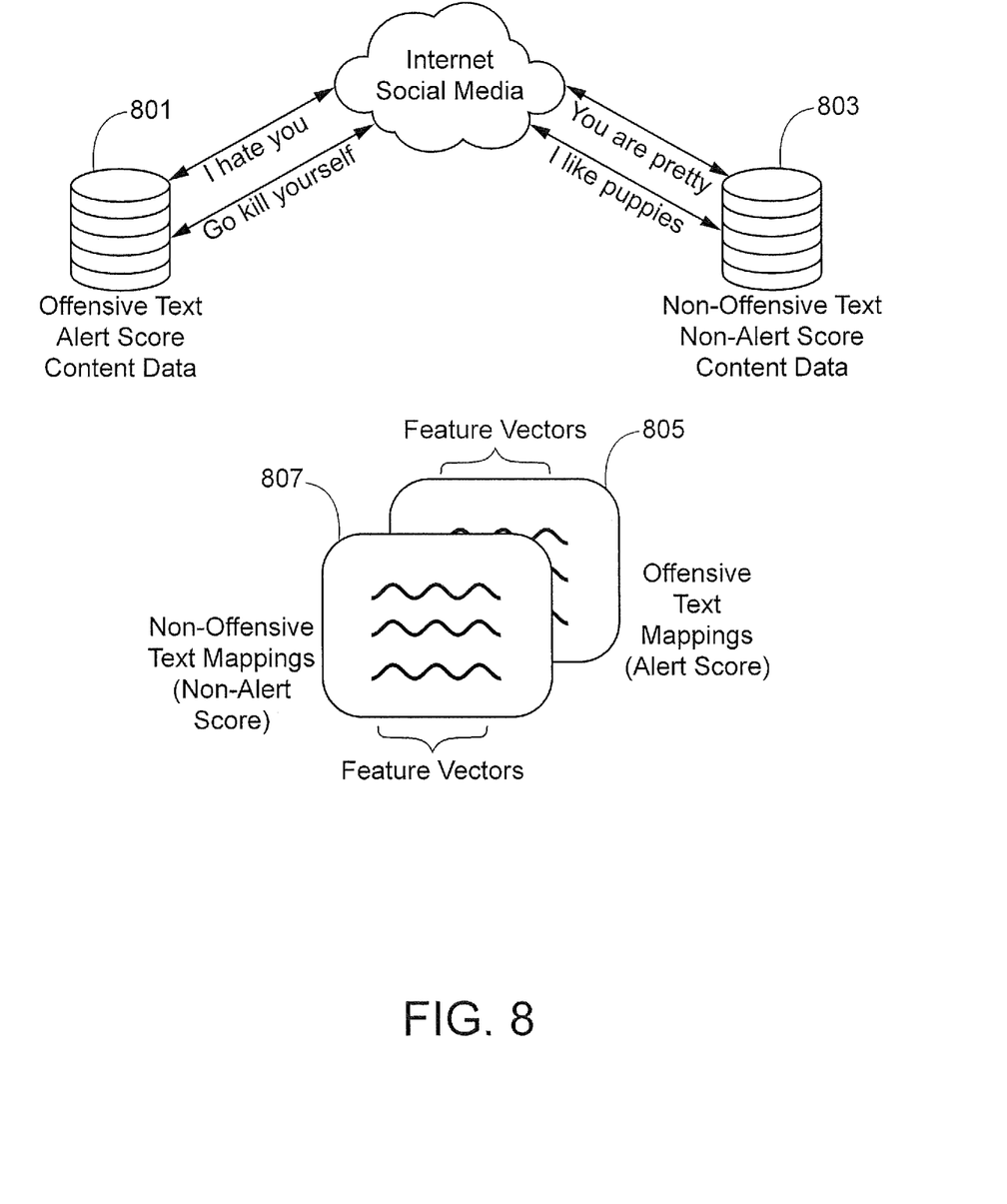
FIG. 8 shows an overview of a process for classifying content comprising text message content.

FIG. 8 shows a diagram of an exemplary training process for establishing a data set comprising baseline content values for text message content. Content data ingested into training modules results in the categorization of content into one of two categories: content that is categorized as alert score (offensive) content 801 (examples include hurtful language); and content that is categorized as non-alert score (non-offensive) content 803 (examples include complimentary or neutral language). Feature vectors are then calculated in order to generate offensive text mappings 805 and non-offensive text mappings 807.

Figure 9:
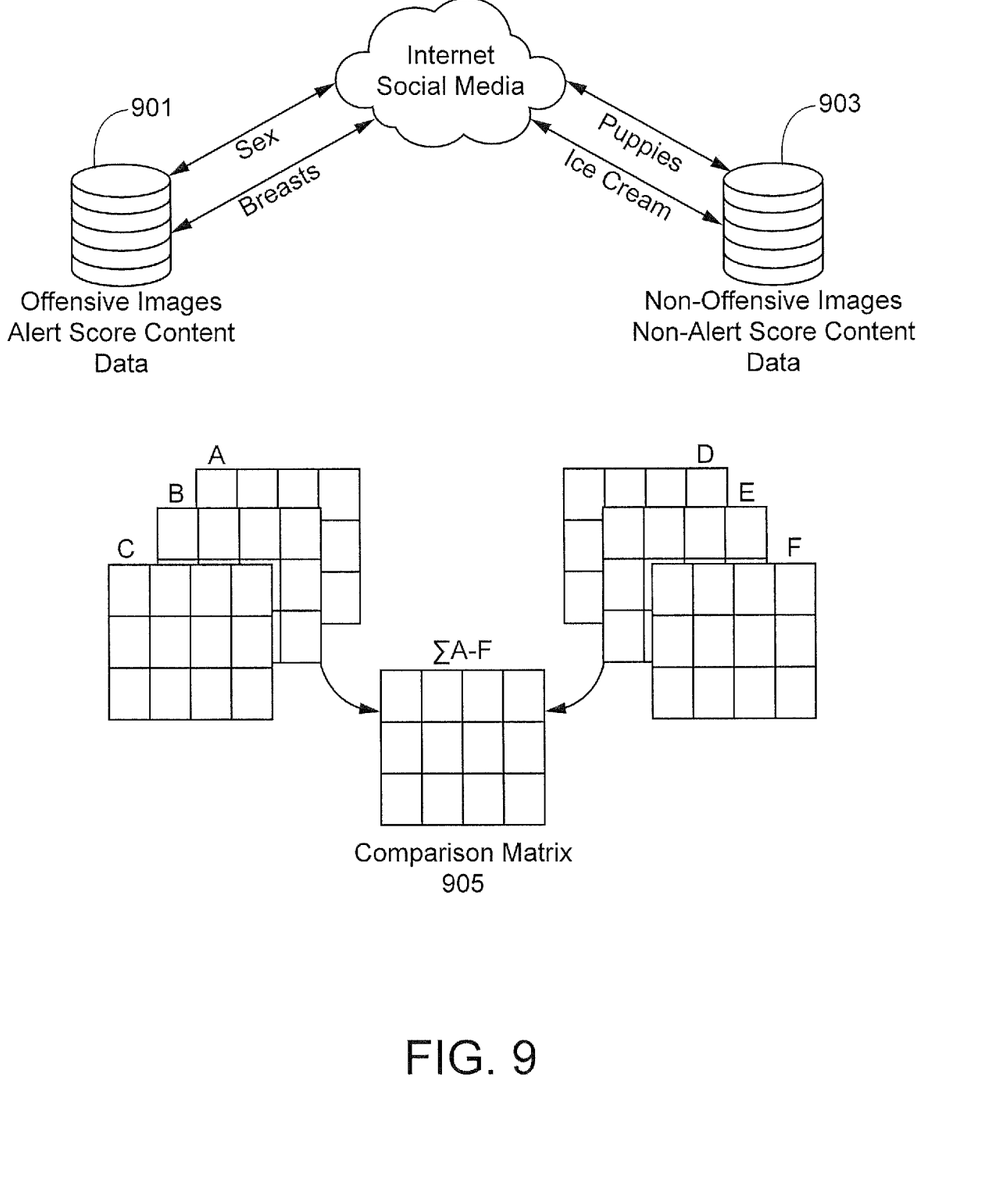
FIG. 9 shows an overview of a process for classifying content comprising digital image content.

FIG. 9 shows a diagram of an exemplary training process for establishing a data set comprising baseline content values for image content (such as digital photos). Content data ingested into training modules results in the categorization of content into one of two categories: content that is categorized as alert score (offensive) content 901 (examples include hurtful language; profanity); and content that is categorized as non-alert score (non-offensive) content 903 (examples include complimentary or neutral language). Mappings—shown in the figures as mapping grids A-F—are then calculated in order to generate a comparison matrix 905, which is the sum of all mappings A through F.

Figure 10:
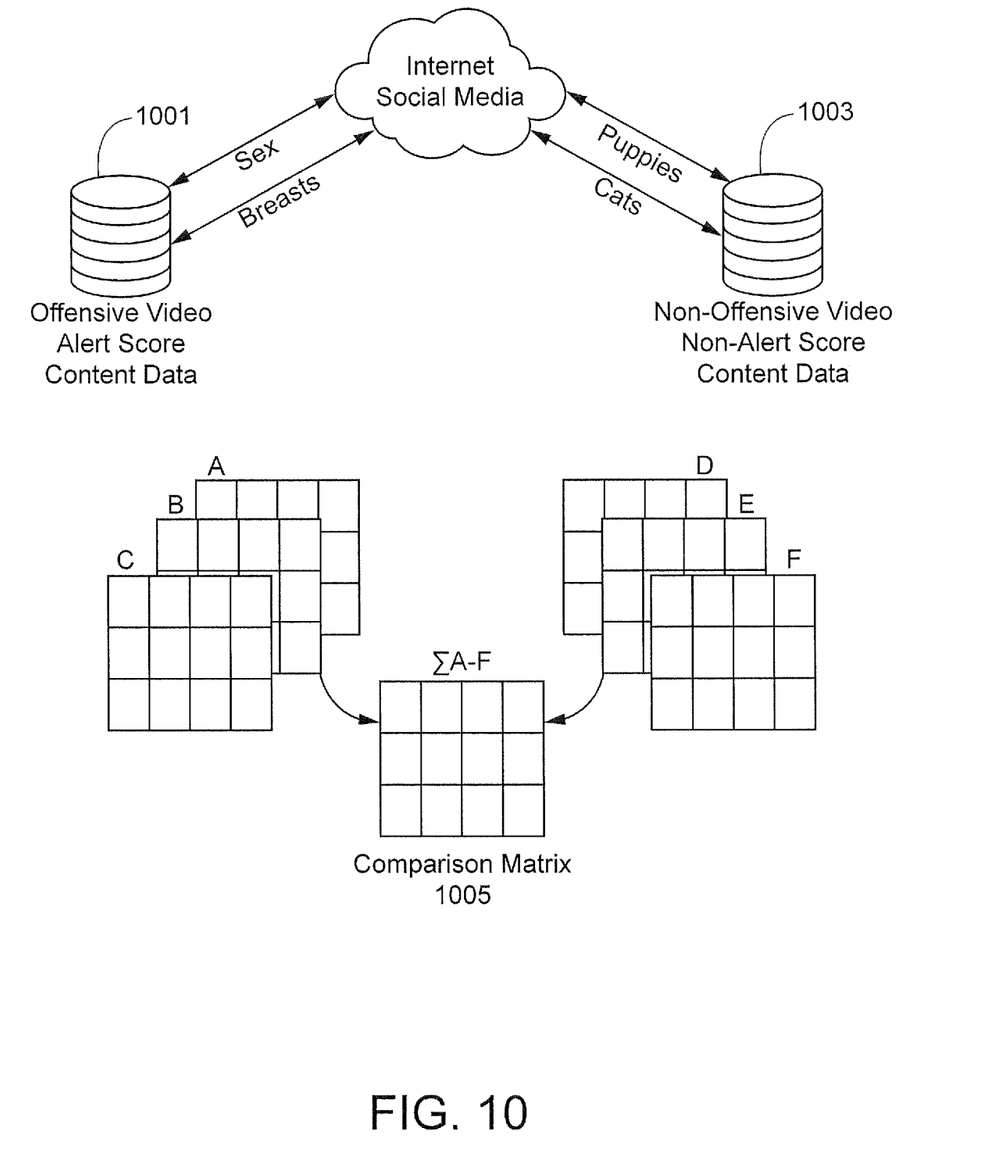
FIG. 10 shows an overview of a process for classifying content comprising video content.

FIG. 10 shows a diagram of an exemplary training process for establishing a data set comprising baseline content values for video content. Content data ingested into training modules results in the categorization of content into one of two categories: content that is categorized as alert score (offensive) content 1001 (examples include hurtful language; profanity); and content that is categorized as non-alert score (non-offensive) content 1003 (examples include complimentary or neutral language).

Mappings—shown in the figures as mapping grids A-F—are then calculated in order to generate a comparison matrix 1005, which is the sum of all mappings A through F.

Figure 11A:
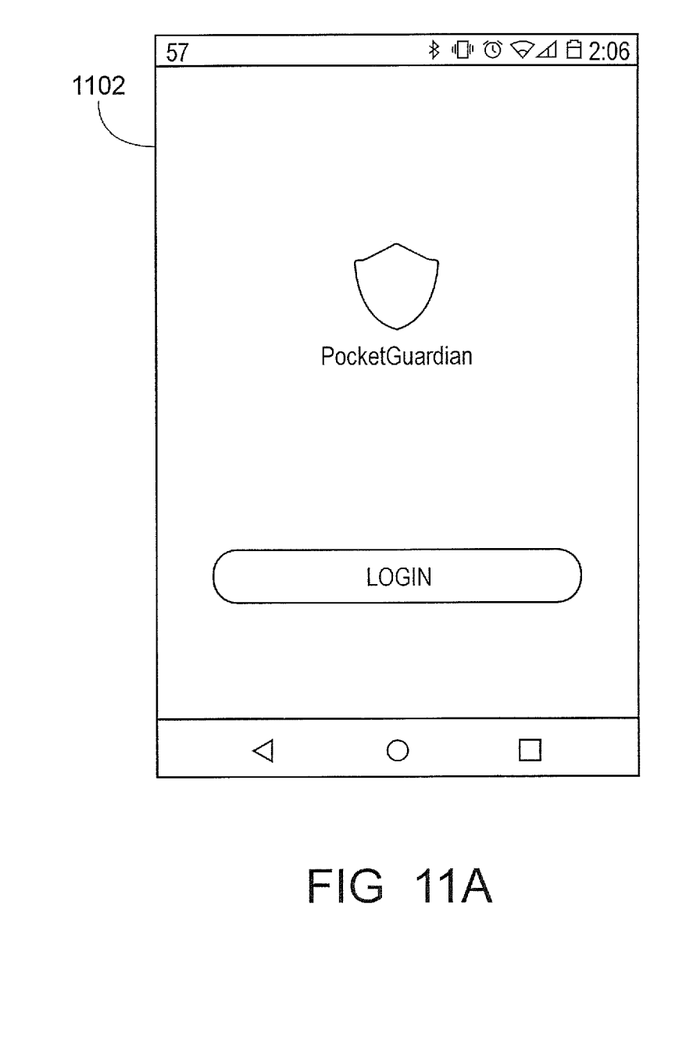
FIGS. 11A&B shows an exemplary embodiment of the invention as a mobile application, showing an alert received on a monitor device.
Figure 11B:
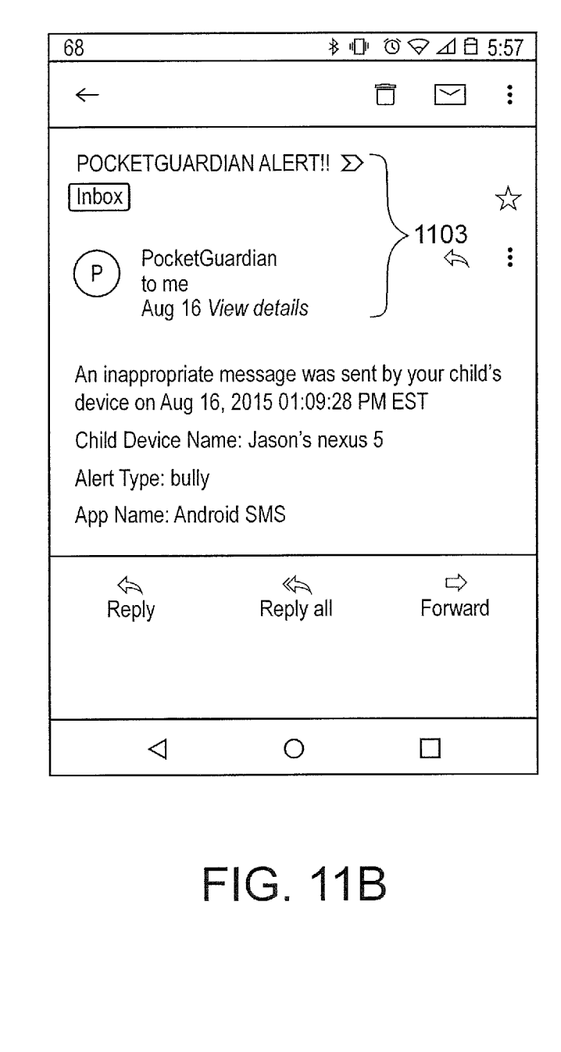

FIG. 11A shows a log-in screen of a reporting device 1102 configured with a monitoring application of the present invention, and showing at 11B an example of an alert message 1103 displayed on the display screen of reporting device 1102. The alert message 1103 includes the following notifications: the date the message was received; the monitored device on which the content was detected; an alert type, based on category and here shown as "bullying" content. The example presented in FIG. 11 is understood to be illustrative of an alert notification not exhaustive as to the presentation or configuration of the alert system. The alert comprises a text message, an email, an audible message, a visual message, or any combination thereof.

Figure 12:
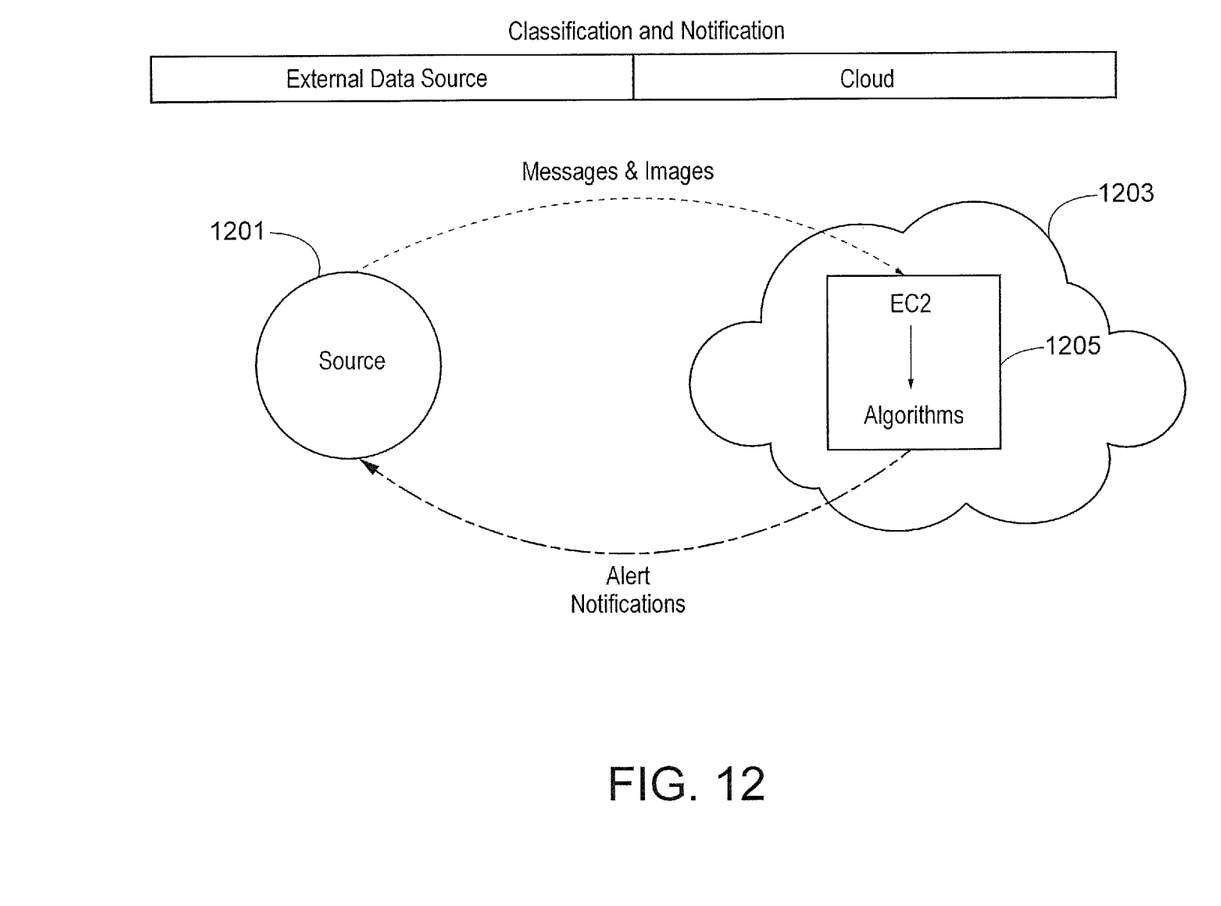
FIG. 12 shows an overview of an exemplary system for classification of content according to one embodiment of the present invention.

FIG. 12 shows an overview of an exemplary system for monitoring communications and classifying content of communications, according to one embodiment of the present invention. In this example, a system is configured for monitoring of communications by an external source 1201. In this example, content (one or more of text, images, and video) is sent to a cloud server 1203 for analysis via a classification algorithm on the server (designated as EC2) 1205. The classification algorithm will extract feature vectors from the content, which are then used in conjunction with feature vectors or training models created from the training data set to calculate an alert score, and thereby determine the likelihood the content is offensive. External source 1201 refers to an entity (person or organization) owned and operated connected device to include but not limited to portable electronic devices, networks of devices, and Cloud networks. Alerts are created when the classification algorithms detect offensive content. Each alert is sent back to the external source.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other components, integers or steps. Throughout this specification, the singular encompasses the plural unless the context otherwise requires. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The reader's attention is directed to all papers and documents which are filed concurrently with or previous to this specification in connection with this application.

What is claimed is:

1. A method for detecting offensive content within one or more wireless communications received on a first portable electronic device, the method consisting essentially of:
   tangibly storing training data received from publicly available sources on a non-transitory computer readable medium;
   receiving and transforming the training data into a normalized representation of the training data into a normalized representation of the training data according to instructions executed by a computer processor;
   extracting at least one first feature vector from the normalized representation and classifying the at least one first feature vector as offensive or non-offensive according to computer program instructions executed by the computer processor;

causing the computer processor execute instructions to receive deleted or undeleted user data from the first portable electronic device, extract at least one second feature vector from the user data, classify the at least one second feature vector in correspondence with the at least one first feature vector as offensive or non-offensive, and calculate a score;

alerting a user of a second portable electronic device that offensive content has been sent from, received on or viewed from the first portable electronic device by causing the computer processor to communicate the score to the second portable electronic device when the score meets a user-determined threshold;

wherein the normalized representation of the training data is a matrix representation compiled by:

iteratively transforming the training data into a group of features selected from the group consisting of words, unigrams, bigrams, stop words, metadata key words, pixel color, pixel shape, and pixel texture; and iteratively mapping the training data according to at least one category of offensive content under human supervision; and wherein the matrix representation comprises at least one comparison matrix consisting of a difference comparison of the distance between each feature of the training data from every other feature;

the at least one first feature vector is multiplied by the at least one comparison matrix to generate a first vector-matrix product;

the classification of the at least one first feature vector as offensive or non-offensive is based on value of the first vector-matrix product; and the at least one second feature vector is multiplied by the at least one comparison matrix to generate a second vector-matrix product; and the score is the difference between the first and second vector-matrix products.

2. The method of claim 1, wherein the one or more wireless communications is a series of wireless communications selected from the group consisting of short message service text message exchanges, email exchanges, digital photo exchanges, video exchanges or combinations thereof.

3. The method of claim 1, wherein the training data comprises metadata, keywords and at least one data source.

4. The method of claim 1, wherein a presence of offensive content correlates positively with the score.

5. The method of claim 1, wherein a presence of offensive content correlates negatively with the score.

6. The method of claim 1, wherein the training data is selected from the group consisting of text data, image data and video data.

7. The method of claim 1, wherein the offensive content relates to cyberbullying, sexting, sexually explicit images, sexually explicit videos, nude images, nude videos, hate speech, profanity, abusive language, epithets, threats, violent language or violent images.

* * * * *